United States Patent [19]
Hasuo et al.

[11] Patent Number: 4,775,739
[45] Date of Patent: Oct. 4, 1988

[54] PROCESS FOR PRODUCING POLYCARBONATE RESIN WITH TERTIARY ALRYL PHENOL MOLECULAR WEIGHT MODIFIER

[75] Inventors: Masayoshi Hasuo, Yokohama; Hiroshi Urabe, Kawasaki; Masahiro Nukui, Tokyo, all of Japan

[73] Assignee: Mitsubishi Chemical Industries Limited, Tokyo, Japan

[21] Appl. No.: 55,352

[22] Filed: May 29, 1987

[30] Foreign Application Priority Data

Jun. 18, 1986 [JP] Japan ................. 61-142166
Jul. 10, 1986 [JP] Japan ................. 61-162781

[51] Int. Cl.⁴ ............................. C08G 63/62
[52] U.S. Cl. ......................... 528/198; 528/196; 528/201
[58] Field of Search ........................ 528/198

[56] References Cited

U.S. PATENT DOCUMENTS 3,240,756  3/1966  Deanin et al. ............... 528/198
4,269,964  5/1981  Freitag et al. .............. 528/198
4,699,971 10/1987  Mark ........................ 528/198

Primary Examiner—Harold D. Anderson
Attorney, Agent, or Firm—Oblon, Fisher, Spivak, McClelland & Maier

[57] ABSTRACT

A process for producing a polycarbonate resin having a viscosity-average molecular weight of from 9,000 to 50,000 by reacting at least one bisphenol compound with phosgene or a carbonate, characterized in that a phenol compound having the formula:

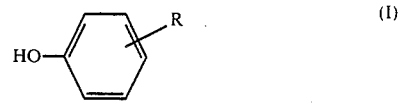

wherein R is an alkyl group having from 5 to 7 carbon atoms, and R is located at the ortho- or para-position relative to the OH group, is used as a molecular weight modifier.

12 Claims, No Drawings

PROCESS FOR PRODUCING POLYCARBONATE RESIN WITH TERTIARY ALRYL PHENOL MOLECULAR WEIGHT MODIFIER

The present invention relates to a process for producing a polycarbonate resin having improved flowability. More particularly, it relates to a process for producing a polycarbonate resin wherein a certain monofunctional organic compound is used as a molecular weight modifier. The polycarbonate resin produced by the process of the present invention has excellent transferability and excellent optical properties such as minimum optical distortion, and thus is suitable for use as an optical material.

The polycarbonate resin is known as an engineering plastic which has excellent heat resistance, mechanical strength and dimensional stability, and it is widely used for various parts of automobiles or of electronic and electric devices or instruments. The polycarbonate resin has a high melting viscosity, and it has been common to conduct the molding operation at a high temperature of from 280° to 320° C. to secure adequate flowability to obtain a molded product. However, at such a high temperature, it is hardly possible to avoid thermal decomposition of the polycarbonate resin, whereby the color tone of the resin deteriorates, and the molecular weight decreases, thus leading to problems such as a poor outer appearance or poor strength of the molded product. Therefore, it has been desired to improve the flowability of the resin and to improve the material so that it can be molded at a relatively low temperature.

Monofunctional phenol compounds are known as molecular weight modifiers (Japanese Unexamined Patent Publications No. 34992/1976 and No. 45792/1980). In these compounds, the functional groups contain at least 8 carbon atoms. In the case of Japanese unexamined Patent Publication No. 34992/1976, the flowability can be improved, but the glass transition temperature and the impact resistance drop substantially, such being undesirable. Whereas, in the case of Japanese Unexamined Patent Publication No. 45792/1980 no adequate effect for the improvement of the flowability is obtainable although the glass transition temperature and the impact strength are satisfactory. A molded product to be used for optical applications, such as a molded product in the form of a plate, a sheet or a lens, is required to be transparent and have minimum optical distortion. Especially when it is used for an optical information recoding material such as an optical disc wherein digital signals are utilized, the optical distortion of the molded product is required to be within a range of ±20 nm preferably ±5 nm by single pass retardation, while maintaining excellent transferability of the guide grooves from the stamper. For the production of such a molded product on an industrial scale, it is advantageous to employ an injection molding method by using a polycarbonate resin having excellent transparency, dimensional stability and heat resistance. In order to improve the transferability and minimize the optical distortion, it has been common to reduce the molecular weight of the resin, or to raise the temperature for melting the resin during the molding, so that the melt flowability is improved.

However, if the molecular weight of the resin is reduced, the mechanical strength of the disc deteriorates, and it is difficult to obtain a satisfactory molded product. Whereas, if the temperature for melting the resin during the molding is kept high, various problems such as a reduction of the molecular weight due to the thermal degradation of the resin, generation of gas and yellowing, are likely to result.

Under the circumstances, the present inventors have conducted extensive research with an aim to improve the flowability and the optical properties of the polycarbonate resin, and have finally arrived at the present invention.

The present invention provides a process for producing a polycarbonate resin having a viscosity-average molecular weight of from 9,000 to 50,000 by reacting at least one bisphenol compound with phosgene or a carbonate, characterized in that a phenol compound having the formula:

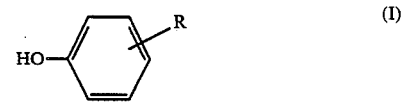

wherein R is an alkyl group having from 5 to 7 carbon atoms, and R is located at the ortho- or para-position relative to the OH group, is used as a molecular weight modifier.

Now, the present invention will be described in detail with reference to the preferred embodiments.

In the present invention, the polycarbonate resin having a viscosity-average molecular weight of from 9,000 to 50,000 is obtained by reacting at least one bisphenol compound with phosgene or with a carbonate precursor such as a diphenyl carbonate.

Specific examples of the bisphenol compound which may be empolyed in the present invention, include bis-(4-hydroxyphenyl)methane, 1,1-bis-(4-hydroxyphenyl)ethane, 1,1-bis-(4-hydroxyphenyl)propane, 2,2-bis-(4-hydroxyphenyl)propane i.e. bisphenol A, 2,2-bis-(4hydroxyphenyl)butane, 2,2-bis-(4-hydroxyphenyl)pentane, 2,2-bis-(4-hydroxyphenyl)-3-methylbutane, 2,2-bis-(4-hydroxyphenyl)hexane, 2,2-bis-(4-hydroxyphenyl)-4-methylpentane, 1,1-bis-(4-hydroxyphenyl)cyclopentane, 1,1-bis-(4-hydroxyphenyl)cyclohexane, bis-(4-hydroxy-3-methylphenyl)methane, 1,1-bis-(4-hydroxy-3-methylphenyl)ethane, 2,2-bis-(4-hydroxy-3-methylphenyl)propane, 2,2-bis-(4-hydroxy-3-ethylphenyl)propane, 2,2-bis-(4-hydroxy-3-isopropylphenyl)propane, 2,2-bis-(4-hydroxy-3-sec-butylphenyl)propane, bis-(4-hydroxyphenyl)phenylmethane, 1,1-bis-(4-hydroxyphenyl)-1-phenylethane, 1,1-bis-(4-hydroxyphenyl)-1-phenylpropane, bis-(4-hydroxyphenyl)diphenylmethane, bis-(4-hydroxyphenyl)dibenzylmethane, 4,4'-dihydroxydiphenylether, 4,4'-dihydroxydiphenylsulfone, 4,4'-dihydroxydiphenylsulfide and phenolphthalein.

Specifically, to carry out the present invention, the method for producing a polycarbonate resin from at least one bisphenol compound and phosgene, is conducted in such a manner that an aqueous alkaline solution or pyridine is added as an acid acceptor to the bisphenol compound in the presence of an innert solvent such as 1,2-dichloromethane, and the reaction is carried out while introducing phosgene.

When an aqueous alkaline solution is used as an acid acceptor, the reaction rate can be increased by using as a catalyst a tertiary amine such as trimethylamine or triethylamine, or a quaternary ammonium compound such as tetrabutylammonium chloride or benzyltributylammonium bromide.

The reaction temperature is preferably from 0° to 100° C.

The catalyst may be present from the beginning, or may be introduced after the preparation of an oligomer for further polymerization.

When two or more bisphenol compounds are used for copolymerization, it is possible to employ an optional method, for example (a) they are simultaneously reacted for polymerization, (b) one of them is first reacted with phosgene, and after the reaction is conducted to some extent, the other compound is introduced for polymerization, or (c) they are independently reacted with phosgene to prepare the respective oligomers, which are then reacted for polymerization.

In the phenol compound of the formula I to be used in the present invention, R is e.g. a pentyl group, a hexyl group or a heptyl group at the ortho- or para-position. If the carbon number of the alkyl group is 4 or less, no adequate effect for improving the flowability will be obtained. On the other hand, if the carbon number is 8 or more, the glass transition temperature (Tg) of the resin tends to be remarkably low and the heat resistance will be impaired, when the alkyl group is of a straight chain, and no adequate effect for improving the flowability will be obtained when the alkyl group is branched. In the present invention, the alkyl group may be of a straight chain or branched. Preferably, however, the α-carbon relative to the aromatic ring is tertiary. Specifically, tert-hexylphenol and tert-amylphenol are preferably employed.

The phenol compound of the formula I as a molecular weight modifier is used to be coexistent with a bisphenol compound. For this purpose, it is possible to empoly an optional method, for example as (a) it is coexistent with the bisphenol comound from the biginning, or (b) after the preparation of an oligomer of the bisphenol compound, it is added for the polymerization of the oligomer.

The amount of the phenol compound as a molecular weight modifier in the present invention, is determined depending upon the desired molecular weight. Namely, when a samll amount is used relative to the bisphenol compound, a resin having a high molecular weight will be obtained. On the other hand, when it is used in a large amount, a resin having a low molecular weight is obtainable. Preferably, it is used in an amount of from 1.0 to 10 mol %, relative to the bisphenol compound. Namely, if the amount is less than 1.0 mol %, a polycarbonate having a high melecular weight is obtained, but the proportion of the molecular weight modifier being attached to the terminal ends tends to be too small, whereby the effect for improving the flowability tends to be small. On the other hand, if it exceeds 10 mol %, the proportion of the molecular weight modifier of the present invention being attached to the terminal ends tends to be large, and the flowability improves remarkably, but the molecular weight tends to be so low that the strength of the molded products will be inadequate. The phenol compound of the formula I is used, more preferably, in an amount of from 2.0 to 9.0 mol % relative to the bisphenol compound. When the polycarbonate resin produced by the process of the present invention is intended for an optical material, the phenol compound of the formula I is used in an optional amount within a range of from 4.2 to 9.0 mol % relative to the bisphenol compound. Namely, if the amount is less than 4.2 mol %, the flowability will be inadequate for optical application, and it will be difficult to obtain an optical material having excellent transferability and small optical distortion. On the other hand, if the amount exceeds 9.0 mol %, the yield tends to be poor, since the molded products tend to have cracks during the injection molding.

The viscosity-average molecular weight (M) is calculated by the following equation from the viscosity $\eta sp$ as measured at 20° C. by using a methylene chloride solution containing 6.0 g/l of the polycarbonate resin.

$$\eta sp/C = [\eta](1 + K'\eta sp)$$

$$[\eta] = KM^\alpha$$

where
C: Polymer concentration (g/liter)
$[\eta]$: Intrinsic viscosity
K': 0.28
K: $1.23 \times 10^{-5}$
α: 0.83
M : Average molecular weight The polycarbonate resin obtained by the present invention preferably has a viscosity-average molecular weight of from 9,000 to 50,000, more preferably from 9,000 to 30,000. When it is used for an optical material, the viscosity-average molecular weight is particularly preferably within a range of from 9,000 to 22,000.

The resin of the present invention is a polycarbonate resin having the specific alkyl groups at the terminals, as mentioned above, whereby the flowability "Q value" is remarkably improved.

Here, the Q value is the melt viscosity as measured by a flow tester, which represents the amount of the molten resin extruded from a nozzle of 1 mm in diameter $\times$ 10 mm in length at 280° C. under a pressure of 160 kg/cm$^2$, as represented by the unit of cc/sec.

The composition of the present invention may further contain conventional additives which may usually be incorporated to plastics, such as a heat stabilizer, a releasing agent, an antistatic agent, a photo stabilizer, a dyestuff, a pigment or a filler, so long as such additives do not adversely affect the properties of the resin.

When the resin is used for an optical material, it is preferred to add from 0.01 to 2% by weight of a phosphite to the resin, whereby the coloring or the deterioration of the transparency due to the decomposition of the resin can be controlled. As such a phosphite, tributyl phosphite, tri(2-ethylhexyl)phosphite, tridecyl phosphite, tristearyl phosphite, triphenyl phosphite, tricresyl phosphite, 2-ethylhexyldiphenyl phosphite, decyldiphenyl phosphite, tricyclohexyl phosphite or distearylpentaerylthrityl diphosphite, may be mentioned. Such a phosphite may be incorporated by dry blending, or may be melt-mixed during the pelletizing by an extruder. Alternatively, master pellets having a high concentration of such a phosphite may be prepared and dry-blended with pellets containing no such a phosphite.

The optical material may be molded usually by injection molding or injection compression molding. The molding temperature is usually within a range of from 28° to 400° C., preferably from 300° to 380° C. If the molding temperature is lower than 280° C., the melt viscosity of the resin is high, and it tends to be difficult to improve the transferability and to reduce the optical distortion of the molded product. On the other hand, if the molding temperature exceeds 400° C., there will be serious problems such as a decrease in the molecular weight of the resin, generation of gas and yellowing of the resin.

When compared with conventional optical polycarbonate molded products having the same viscosity-average molecular weight, the molded products of the present invention made of the polycarbonate resin having the specific alkyl groups at the terminals, are superior in the efficiency for the reduction of the double refraction and in the improvement of the transferability from the mold.

Now, the specific manners for the production of polycarbonates of the present invention and the properties of the optical materials obtained by injection molding will be described with reference to Examples. However, it should be understood that the present invention is by no means restricted to such specific Examples. The Izod impact strength was measured in accordance with ASTM D 256 by using a ⅛ inch test piece. In the Examples, "parts" means "parts by weight" unless otherwise specified.

EXAMPLE 1

Preparation of oligomer 2,2-bis-(4-hydroxyphenyl)propane: 100 parts
Sodium hydroxide: 40 parts
Water: 600 parts The above mixture was charged into a reactor equipped with a stirrer and stirred at 800 rpm, and 375 parts of methylene chloride and 3.1 parts of tert-hexylphenol were added thereto. Then, 57 parts of phosgene was blown in over a period of 60 minutes while cooling the mixture at a temperature of not higher than 20° C. After the completion of the reaction, the stirring was stopped, and the reaction solution was separated into two layers. The lower layer of the methylene chloride solution of the polycarbonate oligomer was collected. The oligomer solution thus obtained was analyzed, and the results are as follows.

Oligomer concentration: 25.2% by weight (Note 1)
Terminal chloroformate group concentration: 0.79N (Note 2)
Terminal phenolic hydroxyl group concentration: 0.07N (Note 3)

The oligomer solution obtained by the above method will be referred to as Oligomer Solution A.

Note (1) Evaporated to dryness and measured.
Note (2) Reacted with aniline, and the aniline hydrochloride thus obtained was titrated by neutralization with a 0.2N sodium hydroxide aqueous sloution.
Note (3) Dissolved in an acetic acid solution of titanium tetrachloride, and the color was measured by colorimetry at 546 nm.

Preparation of polymer

Oligomer Solution A: 140 parts
Methylene chloride: 60 parts

The above mixture was charged into a reactor equipped with a stirrer, and stirred at 550 rpm, and then an aqueous solution having the following composition was added:

12 wt % sodium hydroxide aqueous solution: 58 parts
Triethylamine: 0.25 parts

The mixture was subjected to interfacial polymerization for 3 hours, and then left to stand still for separation, whereby a methylene chloride solution containing a polycarbonate was obtained.

The polymer solution thus obtained was diluted with 200 parts of methylene chloride, and washed with an aqueous sodium hydroxide solution, with an aqueous hydrochloric acid solution, and then with water. Finally, methylene chloride was evaporated to obtain the resin.

This resin had a viscosity-average molecular weight of 19,500.

The Q value, the Tg value and the Izod impact strength of this resin are shown in Table 1.

EXAMPLE 2

Polycarbonate oligomer solution A: 140 parts
Methylene chloride: 80 parts

The above mixture was charged into a reactor equipped with a stirrer, and stirred at 550 rpm, and 73 parts of an aqueous solution containing 16.6% by weight of a sodium salt of 2,2-bis-(4-hydroxyphenyl)propane, 7 parts of an aqueous solution containing 25% by weight of sodium hydroxide and 0.25 parts of triethylamine were added thereto. The mixture was subjected to interfacial polymerization for 3 hours. After the polymerization, the stirring was stopped, and the reaction solution was left to stand still for separation into two layers, whereby the lower layer of a methylene chloride solution containing a polycarbonate was obtained.

The polymer solution thus obtained was purified in the same manner as in Example 1, and finally methylene chloride was evaporated to obtain the resin.

This resin had a viscosity-average molecular weight of 23,200.

The Q value, the Tg value and the Izod impact strength of this resin are shown in Table 1.

COMPARATIVE EXAMPLE 1

Preparation of oligomer

A methylene chloride solution of an oligomer was prepared in the same manner as in Example 1, except that 2.9 parts of p-tert-butylphenol was used instead of 3.1 parts of tert-hexylphenol as the molecular weight modifier. This solution will be referred to as Oligomer Solution B.

Oligomer B was analyzed, and the results are as follows:

Oligomer concentration: 24.2% by weight
Terminal chloroformate group concentration : 0.62N
Terminal phenolic hydoxyl group concentration: 0.05N (The measurements were conducted in the same manner as in Example 1.)

Preparation of polymer

A polycarbonate resin was prepared in the same manner as in Example 1 except that 140 parts of Oligomer Solution B was used instead of 140 parts of Oligomer Solution A as the methylene chloride solution of the oligomer, and 58 parts of the 12 wt % sodium hydroxide aqueous solution was changed to 46 parts. This resin had a viscosity-average molecular weight of 19,600.

The Q value, the Tg value and the Izod impact strength of this resin are shown in Table 1,

Comparative Example 2

140 parts of Oligomer Solution B diluted with 80 parts of methylene chloride, was charged into a reactor equipped with a stirrer, and stirred at 550 rpm. Then, 57 parts of an aqueous solution containing 16.6% by weight salt of 2,2-bis-(4-hydroxyphenyl)propane, 5.3 parts of an aqeous solution containing 25% by weight of sodium hydroxide and 0.25 part of triethylamine were added thereto, and the mixture was subjected to interfacial polymerization for 3 hours. After the polymerization, the stirring was stopped and the reaction solution was left to stand still for separation into two layers, whereby the lower layer of a methylene chloride solution containing a polycarbonate was obtained.

The polymer solution thus obtained was purified in the same manner as in Example 1, and finally methylene chloride was evaporated to obtain the resin. This resin had a viscosity-average molecular weight of 23,000.

The Q value, the Tg value and the Izod impact strength of the resin are shown in Table 1.

Comparative Example 3

Preparation of oligomer

A methylene chloride solution of an oligomer was prepared in the same manner as in Example 1 except that 4.4 parts of n-dodecylphenol (a mixture of ortho- and para-isomers) was used instead of 3.1 parts of tert-hexylphenol as the molecular weight modifier. This solution will be referred to as Oligomer Solution C.

Oligomer Solution C was analyzed, and the results are as follows:
  Oligomer concentration: 25.5% by weight
  Terminal chloroformate group concentration: 0.71N
  Terminal phenolic hydroxyl group concentration: 0.08N (The measurements were conducted in the same manner as in Example 1.)

Preparation of polymer

A polycarbonate resin was prepared in the same manner as in Example 1 except that 140 parts of Oligomer Solution C was used instead of 140 parts of Oligomer Solution A as the methylene chloride solution of the oligomer, and 58 parts of the 12 wt % sodium hydroxide aqueous solution was changed to 52 parts. This resin had a viscosity-average molecular weight of 19,300.

The Q value, the Tg value and the Izod impact strength of this resin are shown in Table 1.

PREPARATION OF OLIGOMER

Preparation of oligomer

A methylene chloride solution of an oligomer was prepared in the same manner as in Example 1 except that 3.6 parts of 4-(1,1,3,3-tetramethylbutyl)phenol was used instead of 3.1 parts of tert-hexylphenol as the molecular weight modifier. This solution will be referred to as Oligomer Solution D. Oligomer Solution D was analyzed, and the results are as follows:
  Oligomer concentration: 25.3% by weight
  Terminal chloroformate group concentration: 0.77N
  Terminal phenolic hydroxyl group concentration: 0.07N (The measurements were conducted in the same manner as in Example 1.)

Preparation of polymer

A polycarbonate resin was prepared in the same manner as in Example 1 except that 140 parts of Oligomer Solution D was used instead of 140 parts of Oligomer Solution A as the methylene chloride solution of the oligomer, and 58 parts of the 12 wt % sodium hydroxide aqueous solution was changed to 57 parts. This resin had a viscosity-average molecular weight of 19,400.

The Q value, the Tg value and the Izod impact strength of this resin are shown in Table 1.

The Q values, the Tg values and the Izod impact strength of the polycarbonates of Examples 1 and 2 and Comparative Examples 1 to 4 are shown in Table 1.

TABLE 1

| | Molecular weight modifier | Viscosity average molecular weight | Q value × $10^{-2}$ (cc/sec) | Tg (°C.) | Izod impact strength (kg · cm/cm) |
|---|---|---|---|---|---|
| Example 1 | tert-Hexylphenol | 19,500 | 15 | 143 | 95 |
| Example 2 | tert-Hexylphenol | 23,200 | 8.0 | 144 | 104 |
| Comparative Example 1 | p-tert-Butylphenol | 19,600 | 12 | 149 | 96 |
| Comparative Example 2 | p-tert-Butylphenol | 23,000 | 6.5 | 149 | 103 |
| Comparative Example 3 | Dodecaphenol | 19,300 | 19 | 132 | 26 |
| Comparative Example 4 | 4-(1,1,3,3-tetramethylbutyl)-phenol | 19,400 | 13 | 149 | 101 |

Notes:
Q value: Melt viscosity measured by a flow tester, which represents the amount of a molten resin extruded from a nozzle of 1 mm in diameter × 10 mm in length at 280° C. under a pressure of 160 kg/cm².
Tg: Glass transition temperature of the resin as measured by a differential scanning calorimeter.
Izod impact strength: Measured in accordance with ASTM D 256 by using a ⅛ inch test piece.

EXAMPLE 3

Preparation of oligomer 2,2-bis-(4-hydroxyphenyl)propane: 100 parts
Sodium hydroxide: 40 parts
Water: 600 parts The above mixture was charged into a reactor equipped with a stirrer, and stirred at 120 rpm, and 375 parts of methylene chloride and 4.0 parts (5.5 mol %) of p-tert-amylphenol were added thereto. Then, 57 parts of phosgene was blown in over a period of 60 minutes while cooling the mixture at a temperature of not higher than 20° C. After the completion of the reaction, the stirring was stopped, and the reaction solution was separated into two layers. The lower layer of a methylene chloride solution of a polycarbonate oligomer was collected. The oligomer solution thus obtained was analyzed, and the results are as follows.

Oligomer concentraton: 26.4% by weight
Terminal chloroformate group concentration: 0.64N
Terminal phenolic hydroxyl group concentration: 0.10N (The measurements were conducted in the same manner as in Example 1.)

The oligomer solution thus obtained will be referred to as Oligomer Solution E.

Preparation of polymer

Oligomer Solution E: 140 parts
Methylene chloride: 80 parts

The above mixture was charged into a reactor equipped with a stirrer, and the strirred at the 100 rpm. Further, an aqueous solution having the following composition was added thereto:

10 wt % sodium hydroxide aqueous solution: 57 parts
2 wt % triethylamine aqueous solution: 0.7 parts The mixture was then subjected to interfacial polymerization for 3 hours.

The polymer solution was separated into an aqueous layer and a methylene chloride layer containing a polycarbonate. The methylene chloride layer was washed with an aqueous sodium hydroxide solution, with an aqueous hydrochloric acid solution and then with deionized water, and finally methylene chloride was evaporated to obtain a concentrated polycarbonate methylene chloride solution. Then, this concentrated solution was subjected to kneader to obtain white flakes of the polycarbonate. The white flakes were dried, and a heat stabilizer was added thereto. The mixture was then pelletized by a 40 mm extruder with a vent.

The pellets thus obtained had a Viscosity average molecular weight of 14,500.

EXAPLE 4

Preparation of oligomer

A methylene chloride solution of an oligomer was prepared in the same manner as in Example 3 except that 4.0 parts (5.1 mol %) of tert-hexylphenol was used instead of 4.0 parts of p-tert-amylphenol as the molecular weight modifier. The solution will be referred to as Oligomer Solution F. Oligomer solution F was analyzed, and the results are as follows.

Oligomer concentration: 25.3% by weight
Terminal chloroformate group concentration: 0.71N
Terminal phenolic hydroxyl group concentration: 0.08N (The measurements were conducted in the same manner as in Example 1.)

Prepartion of polymer

A polycarbonate resin was prepared in the same manner as in Example 3 except that 140 parts of Oligomer Solution F was used instead of 140 parts of Oligomer Solution E, and 57 parts of the 10 wt % sodium hydroxide aqueous solution was changed to 63 parts. The pellets thus obtained had a viscosity-average molecular weight of 15,300.

EXAMPLE 5

Preparation of polymer

Oligomer Solution F: 140 parts
Methylene chloride: 70 parts
tert-Hexylphenol: 0.12 part The above mixture was charged into a reactor equipped with a stirrer, and stirred at 100 rpm. Then, an aqueous solution having the following composition was added thereto:

10 wt % sodium hydroxide aqueous solution: 63 parts
2 wt % Triethylamine aqueous solution: 0.7 part The mixture was then subjected to interfacial polymerization for 3 hours. The polymer solution thus obtained was purified, powdered, dried and pelletized in the same manners as in Example 3.

The pellets thus obtained had a viscosity-average molecular weight of 14,300.

COMPARATIVE EXAMPLE 5

Prepration of oligomer

A methylene chloride solution of an oligomer was prepared in the same manner as in Example 3 except that 3.6 parts (5.4 mol %) of p-tert-butylphenol was used instead of 4.0 of parts of p-tert-amylphenol as the molecular weight modifier. This solution will be referred to as Oligomer Solution G. Oligomer Solution G was analyzed, and the results are as follows.

Oligomer concentration: 25.5% by weight
Terminal chloroformate group concentration: 0.74N
Terminal phenolic hydroxyl group concentration: 0.08N (The measurements were conducted in the same manner as in Example 1.)

Preparation of polymer

A polycarbonate resin was prepared in the same manner as in Example 3 except that 140 parts of Oligomer Solution G was used instead of 140 parts of Oligomer Solution E, and 57 parts of the 10 wt % sodium hydroxide aqueous solution was changed to 67 parts.

The pellets thus obtained had a viscosity-average molecular weight of 14,500.

COMPARATIVE EXAMPLE 6

Preparation of polymer

Oligomer solution G: 140 parts
Methylene chloride: 70 parts
p-tert-Butylphenol: 0.04 part The above mixture was charged into a reactor equipped with a stirrer, and stirred at 100 rpm. Then, an aqueous solution having the following composition was added:

10 wt % sodium hydroxide aqueous solution: 67 parts
2 wt % triethylamine aqueous solution: 0.7 part The mixture was then subjected to interfacial polymerization for 3 hours. The polymer solution thus obtained was treated in the same manner as in Example 3 to obtain a polycarbonate resin. The pellets thus obtained had a viscosity-average molecular weight of 14,000.

The Q values of the polycarbonate resins obtained in Examples 3 to 5 and Compratative Examples 5 and 6 are shown in Table 2.

These resins were subjected, respectively, to injection compression molding by a disc molding machine (Dinamelter M140A-D-DM, with a mold equipped with a groove stamper having a groove depth of 670 Å, manufactured by Meiki K. K.) to form discs having a diameter of 130 mm and a thickness of 1.2 mm. The molding conditions were such that the molding temperature was 330° C., the mold temperature was 110° C., and the pressure was adjusted to the best condition after various trials.

The double refraction was measured by an Ellipsometer manufactured by Mizojiri Kogaku Kogyo K. K. at points with radii of 2.8 and 4.8 cm from the center of each disc thus obtained, and the depth of the groove was measured by an electron beam surface profile analyser, manufactured by Elionicks K. K. The results are also shown in Table 2.

TABLE 2

| | Molecular weight modifier | | Viscosity-average molecular weight | Q (cc/sec) | Double refraction (nm) | | Transferability (Å) | |
|---|---|---|---|---|---|---|---|---|
| | Type | Amount (mol %) | | | r = 2.8 cm | r = 4.8 cm | r = 2.8 cm | r = 4.8 cm |
| Example 3 | PAP | 5.5 | 14,500 | $4.6 \times 10^{-1}$ | 20 | 9 | 600 | 600 |
| Example 4 | THP | 5.1 | 15,300 | $3.8 \times 10^{-1}$ | 10 | 7 | 620 | 630 |
| Example 5 | THP | 5.6 | 14,300 | $5.8 \times 10^{-1}$ | −5 | −3 | 630 | 650 |
| Comparative Example 5 | PTBP | 5.4 | 14,500 | $4.0 \times 10^{-1}$ | 34 | 16 | 580 | 590 |
| Comparative Example 6 | PTBP | 5.6 | 14,000 | $5.0 \times 10^{-1}$ | 22 | 10 | 590 | 610 |

PAP: p-ter-Amylphenol
THP: ter-Hexylphenol
PTBP: p-tert-Butylphenol

EXAMPLE 6

Preparation of oligomer 1,1-Bis(4-hydroxyphenyl)-1-phenylethane: 100 parts
Sodium hydroxide: 40 parts
Water: 600 parts
Methylene chloride: 375 parts The above mixture was charged into a reactor equipped with a stirrer, and stirred at 800 rpm. Then, 57 parts of phosgene was blown therein over a period of one hour to conduct interfacial polymeriazation. After the completion of the reaction, the methylene chloride solution containing the polycarbonate oligomer was collected. The methylene chloride solution of the oligomer thus obtained, was analyzed, and the results are as follows:

Oligomer concentration: 22.5% by weight
Terminal chloroformate group concentration: 0.42N
Terminal phenolic hydroxyl group concentration: 0.020N (The measurements were conducted in the same manner as in Example 1.)

The oligomer solution thus obtained will be referred to as Oligomer Solution H.

Preparation of polymer

Oligomer Solution H: 140 parts
tert-Hexylphenol: 1.4 parts
Methylene chloride: 80 parts The above mixture was charged into a reactor equipped with a stirrer, and stirred at 550 rpm. Then, an aqueous solution having the following composition was added thereto:

7.3 wt % sodium hydroxide aqueous soltuion: 80 parts
2 wt % triethylamine aqueous olution: 1 part The mixture was then subjected to interfacial polymerization for 3 hours. Then, the reaction mixture was subjected to liquid separation. The methylene chloride solution containing the polycarbonate resin was washed with water with an aqueous hydrochloric acid solution and then with water, and finally methylene chloride was evaporated to obtain the resin. This resin had an average molecular weight of 9.400.

EXAMPLE 7

A polycarbonate resin was prepared in the same manner as in Example 6 except that 1.4 parts of tert-hexylphenol was changed to 1.2 parts. The pellets thus obtained had a viscosity-average molecular weight of 11,200.

COMPARATIVE EXAMPLE 7

A polycarbonate resin was prepared in the same manner as in Example 6 except that 1.2 parts of p-tert-butylphenol was used instead of 1.4 parts of tert-hexylphenol. The pellets thus obtained had a viscosity-average molecular weight of 9,800.

COMPARATIVE EXAMPLE 8

A polycarbonate resin was prepared in the same manner as in Example 6 except that 1.0 part of t-tert-butylphenol was used instead of 1.4 parts of tert-hexylphenol. The pellets thus obtained had a viscosity-average molecular weight of 11,000. The Q values and Tg values of the polycarbonate resins obtained in Examples 6 and 7 and Comparative Examples 6 and 7 are shown in Table 3.

TABLE 3

| | Molecular weight modifier | Viscosity average molecular weight | Q value $\times 10^{-2}$ (cc/sec) | Tg (°C.) |
|---|---|---|---|---|
| Example 6 | tert-Hexylphenol | 9,400 | 18 | 171 |
| Example 7 | tert-Hexylphenol | 11,200 | 6.3 | 178 |
| Comparative Example 7 | p-tert-Butylphenol | 9,800 | 10 | 175 |
| Comparative Example 8 | p-tert-Butylphenol | 11,000 | 5.1 | 181 |

When compared with the conventional polycarbonate resins (wherein p-tert-butylphenol was used as the molecular weight modifier) at the same molecular weight level, the polycarbonate resins of the present invention had greater Q values and were superior in the moldability. Thus, the polycarbonate resins of the present invention can be widely used in the fields where high perfomance as engineering plastics is required, such as mechanical parts, electric parts, automobile parts, various containers and packaging materials, in the form of sheets, films or other shaped products prepared by extrusion molding or injection molding.

Especially when they are used as optical materials, they are superior in the transferability with minimum optical distortion, whereby materials having low double refraction can be obtained without impairing the strength of the molded products by reducing the viscosity-average molecular weight unnecessarily, or without relying on severe molding conditions.

We claim:
1. A process for producing a polycarbonate resin having a viscosity-average molecular weight of from

9,000 to 50,000 as measured at 20° C. using a 6.0 g/l solution of the polycarbonate resin in methylene chloride, which comprises reacting at least one bisphenol compound with phosgene or a carbonate precursor in the presence of a phenol compound selected from the group consisting of tert-hexylphenol and tert-amylphenol, which phenol compound is used as a molecular weight modifier.

2. The process according to claim 1, wherein said carbonate precursor is diphenyl carbonate.

3. The process according to claim 1, wherein said bisphenol compound is selected from the group consisting of bis-(4-hydroxyphenyl)methane, 1,1-bis-(4-hydroxyphenyl)ethane, 1,1-bis(4-hydroxyphenyl)propane, 2,2-bis-(4-hydroxyphenyl)propane, 2,2-bis-(4-hydroxyphenyl)butane, 2,2-bis-(4-hydroxyphenyl)pentane, 2,2-bis-(4-hydroxyphenyl)-3-methylbutane, 2,2-bis-(4-hydroxyphenyl) hexane, 2,2-bis-4-hydroxyphenyl)-4-methylpentane, 1,1-bis-(4-hydroxyphenyl)cyclopentane, 1,1-bis-(4-hydroxyphenyl)cyclohexeane, bis-(4-hydroxy-3-methylphenyl)methane, 1,1-bis-(4-hydroxy-3-methylphenyl)ethane, 2,2-bis-(4-hydroxy-3-methylphenyl)propane, 2,2-bis-(4-hydroxy-3-ethylphenyl)propane, 2,2-bis-(4-hydroxy-3-isopropylphenyl)propane, 2,2-bis-(4-hydroxy-3-secbutylphenyl)-propane, bis-(4-4-hydroxyphenyl)phenylmethane, 1,1-bis-(4-hydroxyphenyl))-1-phenylpropane, bis-(4-hydroxyphenyl)diphenylmethane, bis-(4-hydroxyphenyl)dibenzylmethane, 4,4'-dihydroxydiphenylether, 4,4'-dihydroxydiphenylsulfone, 4,4'-dihydroxydiphenylsulfide and pheolphthalein.

4. The process according to claim 1, wherein an effective amount of an aqueous alkaline solution or pyridine is added as an acid acceptor with the bisphenol compound while introducing phosgene thereto.

5. The process according to claim 1, wherein the phenol compound is used in an amount of from 1.0 to 10 mol % relative to the bisphenol compound.

6. The process according to claim 1, wherein the viscosity-average molecular weight is from 9,000 to 30,000.

7. The process according to claim 6, wherein the phenol compound is used in an amount of from 2.0 to 9.0 mol % relative to the bisphenol compound.

8. The process according to claim 1, wherein the viscosity-average molecular weight is from 9,000 to 22,000.

9. The process according to claim 8, wherein the phenol compound is used in an amount of from 4.2 to 9.0 mol % relative to the bisphenol compound.

10. The process according to claim 1, which further comprises adding a tertiary amine or quaternary ammonium compound catalyst to said reaction mixture when an aqueous alkaline solution is used as an acid acceptor.

11. The process according to claim 4, wherein said aqueous alkaline solution is an aqueous sodium hydroxide solution.

12. The process according to claim 10, wherein said tertiary amine is selected from the group consisting of trimethylamine and triethylamine; and said quaternary ammonium compound is selected from the group consisting of tetrabutylammonium chloride and benzyltributylammonium bromide.

* * * * *